United States Patent Office 3,781,388
Patented Dec. 25, 1973

3,781,388
PHOSPHATES
Herbert Jenkner and Otto Konigstein, Cologne, Germany, assignors to Chemische Fabrik Kalk GmbH
No Drawing. Filed Sept. 21, 1971, Ser. No. 182,543
Claims priority, application Germany, Sept. 25, 1970, P 20 47 195.8
Int. Cl. C07f 9/08
U.S. Cl. 260—953                    9 Claims

ABSTRACT OF THE DISCLOSURE

A flame-proofing agent, to polymers, of the formula:

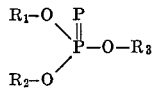

$R_1$ being an halogenated alkyl group; $R_2$ is an alkyl group and $R_3$ is a hydroxy alkyl group.

---

Plastics materials which consist mainly of carbon, hydrogen and for the most part also oxygen are usually readily combustible because of this composition. Since this ready combustibility greatly limits or entirely precludes the use of these plastics materials in some important fields of application, despite their other advantages, a large number of additives have been developed with the aid of which these plastics materials can be rendered almost non-inflammable or completely incombustible. Two or more of these additives, which are jointly added to the same plastics material, often exhibit a synergistic effect, i.e. the flame-proofing effect of this combination of additives is distinctly more pronounced than the sum of their individual effects. Such phenomenon is a very desirable one, since it enables the quantity of additives required for a particular flame-proofing effect to be reduced. However, apart from reasons of economy, the amount of the additives is required to be kept as low as possible, since flame-proofing agents when present in fairly large amounts usually have undesirable side-effects upon the mechanical and physical properties of the plastics material.

Two elements, compounds of which often interact synergistically when used as flame-proofing agents in plastics materials, are phosphorus and bromine. After phosphorus-containing and bromine-containing compounds had first been used together as flame-proofing agents in one and the same plastics material, tests soon revealed that certain organic compounds containing phosphorus and bromine are also capable of producing a synergistic effect.

One of the most frequently used flame-proofing agents of the kind above-described is tris(2,3-dibromoproyl)-phosphate, which is used in dense plastics materials as well as in foam materials. It is a bright yellow viscous liquid, which is mixed with the polymer before or during the operations whereby the latter is converted into a semi-finished product or finished article. This mode of operation which leads only to a purely mechanical mixture of plastics material and flame-proofing agent does not lead to a specific bonding of the flame-proofing agent to the plastics material, so that after some time, particularly when the temperature rises, the flame-proofing agent is exuded, and the protective effect is lost.

Thus, there has been a need for a flame-proofing agent, containing phosphorus and bromine, that can be so firmly incorporated in the plastics material to be protected that exudation of the flame-proofing agent does not occur.

The compounds of this invention are flame-proofing agents for polymeric material, especially those polymers formed from reactants capable of reacting with or have groups capable of reacting with free hydroxy of the compounds of the present invention, such as polyesters and polyurethanes. This agent consists of a compound having the general formula:

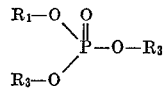

in which $R_1$ is a halogen-containing alkyl radical containing 2 to 4, preferably 3, carbon atoms and containing 1 to 3, preferably 2, halogen atoms, $R_2$ is an alkyl radical containing 2 to 4, preferably 3, carbon atoms, and $R_3$ is an alkyl radical containing 2 to 4, preferably 3, carbon atoms and one OH group.

In this compound, $R_2$ may optionally also contain at least one halogen atom and/or at least one OH group; $R_3$ may optionally also contain at least one halogen atom in addition to the OH group.

The following have proved particularly effective as agents in accordance with the invention:

bis-(dibromopropyl) 1-chloro-2-hydroxypropyl phosphate
dibromopropyl bis-(1-chloro-2-hydroxypropyl) phosphate
bis-(dibromopropyl) hydroxypropyl phosphate
dibromopropyl bis-(hydroxypropyl) phosphate
bis-(dibromopropyl) hydroxyethyl phosphate
dibromopropyl bis-(hydroxyethyl) phosphate.

A method of producing the agent in accordance with the invention has also been discovered. In this method, halogen-containing phosphoric acid esters, particularly mono- or dibromopropyl phosphate and mono- or dichloropropyl phosphate are reacted with epichlorohydrin and epibromohydrin respectively, or with ethylene oxide and propylene oxide respectively.

To produce the flame-proofing agent in accordance with the invention, it is first necessary to obtain the halogen-containing phosphoric acid esters required therefor. For this purpose and using a known method, a small quantity of magnesium chloride may be added to phosphorus oxychloride in a reaction vessel and the mixture heated to a temperature of approximately 100° C. After the reaction temperature has been reached, a halogenated lower saturated alcohol, for example, 2,3-dibromopropanol, is added over a period of several hours, hydrogen chloride being given off. After the mixture has reacted for a further 1 to 2 hours, a fairly small quantity of water is added over a period of a further hour. The corresponding halogenated phosphoric acid ester forms during this period. The hydrogen chloride that is formed at the same time is expelled with the aid of gaseous nitrogen which is blown through the reaction mixture. The halogenated phosphoric acid ester obtained can be used without any further cleaning treatment for forming the flame-proofing agent in accordance with the invention. For this purpose, a temperature of about 20 to 130° C., preferably about 70 to 120° C., is established in the reaction vessel, and an epihalogen compound or an alkylene oxide is added dropwise to the starting material in the vessel over a period of several hours. After the mixture has been allowed to react for a further 1 to 2 hours, the volatile impurities are removed by vacuum distillation. The end product obtained is a neutral halogenated phosphoric acid ester containing free hydroxyl groups, which is usually a bright yellow viscous liquid at room temperature. The agent according to the invention is eminently suitable for the flame-proofing of plastics materials, particularly polyesters or polyurethanes. It is added to the polymer-forming mixture and, with the free hydroxyl group, participates in the poly-condensation or polyaddition reaction. In this way, the agent is firmly incorporated into the macromolecule of the plastics material. There is therefore no risk of the flame-proofing agent being lost by lixiviation, evaporation or exudation and thus of the flame-proofing effect being reduced. Examples are given below for the purpose of explaining in more detail how the flame-proofing agent of the invention may be produced:

EXAMPLE 1

153.5 g. of phosphorus oxychloride and 0.25 g. of magnesium chloride containing water of crystallization are put into a glass apparatus equipped with a stirring mechanism, thermometer, dropping funnel, reflux condenser, and gas-discharge tube. After the mixture has been heated to a temperature of 90° C., 436 g. of 2,3-dibromopropanol are added through the dropping funnel over a period of 4 hours during which the mixture is vigorously stirred and hydrogen chloride is given off. The mixture is allowed to react for a further hour, the reaction temperature being maintained and further stirring being carried out. 18 g. of water are then added during a further period of 1 hour, bis-(dibromopropyl)-phosphate together with further hydrogen chloride being formed. The later is expelled by blowing nitrogen through the mixture. 92 g. of propylene oxide are added dropwise to remaining reaction mixture over a period of 2 hours, the reaction temperature being 90° C. The reaction is allowed to continue for a further hour. The apparatus is then evacuated to a pressure of 5 torr, and the volatile impurities are expelled at a temperature of 90 to 100° C. 593 g. of bis(dibromopropyl)-2-hydroxypropyl phosphate in the form of a bright yellow viscous liquid. It contains 53.2% of bromine, 0.6% of chlorine and 5.3% of phosphorus; it has an acid number of 1, a hydroxyl number of 83 and a viscosity of 1860 cp. at 20° C.

EXAMPLE 2

Bis-(dibromopropyl)-phosphate was produced from 153.5 g. of phosphorus oxychloride, 0.25 g. of magnesium chloride containing water of crystallization, 508 g. of 2,3-dibromopropanol and 12 g. of water, in the same apparatus as that of Example 1 and by the procedure described in that example. After the hydrogen chloride has been expelled, 101 g. of epichlorohydrin are added dropwise to the mixture at a temperature of 90° C. over a period of 2 hours. The reaction is then allowed to continue for a further 1 hour. Finally, as in Example 1, the volatile impurities are expelled by vacuum distillation. 660 g. of bis-(dibromopropyl)-1-chloro-2-hydroxypropyl phosphate in the form of a bright yellow liquid of high viscosity are obtained. It contains 55.2% of bromine, 5.6% of chlorine and 4.8% of phosphorus; it has an acid number of 4, a hydroxyl number of 76 and a viscosity of 8500 cp. at 20° C.

What is claimed is:

1. A compound for flame-proofing polymeric material, having the formula:

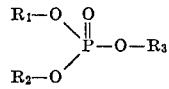

wherein $R_1$ is a halogenated alkyl group having 2 to 4 carbon atoms and 1 to 3 halogen atoms; $R_2$ and $R_3$ are independently selected from the group consisting of [alkyl having 2 to 4 carbon atoms, halogenated alkyl having 2 to 4 carbon atoms and 1 to 3 halogen atoms,] hydroxy alkyl having 2 to 4 carbon atoms and 1 hydroxy group and halogenated hydroxy alkyl having 2 to 4 carbon atoms, 1 to 3 halogen atoms and 1 hydroxy group; and wherein said halogen atoms are bromine or chlorine.

2. A compound in accordance with claim 1, wherein $R_3$ is hydroxy alkyl having 2 to 4 carbon atoms and 1 hydroxy group.

3. A compound in accordance with claim 2, wherein $R_1$ has 3 carbon atoms.

4. A compound in accordance with claim 3, wherein $R_1$ has 3 carbon atoms and 2 halogen atoms.

5. A compound in accordance with claim 1, wherein $R_2$ has 3 carbon atoms.

6. A compound in accordance with claim 1 wherein $R_3$ has 3 carbon atoms.

7. A compound in accordance with claim 1 which is dibromopropyl bis-(1-chloro-2-hydroxypropyl) phosphate.

8. A compound in accordance with claim 1 which is dibromopropyl bis-(hydroxypropyl) phosphate.

9. A compound in accordance with claim 1 which is dibromopropyl bis-(hydroxyethyl) phosphate.

References Cited

UNITED STATES PATENTS 2,909,559    10/1959    Lanham _____ 260—953 X

OTHER REFERENCES

Rizpolozhenskii et al., Chemical Abstracts, vol. 68 (1968), 29790x.

LEWIS GOTTS, Primary Examiner
R. L. RAYMOND, Assistant Examiner

U.S. Cl. X.R.
260—45.7 P, 978